(12) United States Patent
Winkelhorn

(10) Patent No.: US 7,339,740 B2
(45) Date of Patent: Mar. 4, 2008

(54) IMAGE DECODER SYSTEM

(76) Inventor: Karin-Maria K. Winkelhorn, 3540 W. Sahara, Suite 25, Las Vegas, NV (US) 89102

( * ) Notice: Subject to any disclaimer, the term of this patent is extended or adjusted under 35 U.S.C. 154(b) by 411 days.

(21) Appl. No.: 11/183,273

(22) Filed: Jul. 16, 2005

(65) Prior Publication Data

US 2007/0030892 A1    Feb. 8, 2007

(51) Int. Cl.
*G02B 27/10*    (2006.01)
*B42D 15/00*    (2006.01)

(52) U.S. Cl. ............................ 359/625; 283/72; 283/94
(58) Field of Classification Search .................... 359/2, 359/618–629; 283/72, 94, 100, 106–111; 380/54; 273/157 A
See application file for complete search history.

(56) References Cited

U.S. PATENT DOCUMENTS

| | | | |
|---|---|---|---|
| 2,952,080 A | | 9/1960 | Avakian |
| 3,227,474 A | * | 1/1966 | Hoeflinger ................... 283/72 |
| 3,781,109 A | | 12/1973 | Mayer, Jr. et al. |
| 3,784,289 A | | 1/1974 | Wicker |
| 3,969,830 A | | 7/1976 | Grasham |
| 4,605,231 A | | 8/1986 | Richman |
| 4,714,275 A | | 12/1987 | Engel |
| 4,837,071 A | | 6/1989 | Tagoku |
| 5,223,958 A | | 6/1993 | Berry |
| 5,401,032 A | | 3/1995 | Barnhart |
| 5,467,441 A | | 11/1995 | Stone |
| 5,656,360 A | | 8/1997 | Faykish |
| 5,893,101 A | | 4/1999 | Balogh |
| 5,896,230 A | | 4/1999 | Goggins |
| 6,246,796 B1 | | 6/2001 | Horikoshi et al. |
| 6,273,473 B1 | | 8/2001 | Taylor |
| 6,296,900 B1 | | 10/2001 | Barnhart |
| 6,565,089 B1 | | 5/2003 | Matos |
| 6,692,031 B2 | | 2/2004 | McGrew |
| 6,794,004 B1 | | 9/2004 | Netsch |
| 6,859,534 B1 | | 2/2005 | Alasia |
| 6,865,001 B2 | | 3/2005 | Long |
| 2003/0015866 A1 | * | 1/2003 | Cioffi et al. ................... 283/72 |
| 2005/0052017 A1 | | 3/2005 | Alasia |

* cited by examiner

*Primary Examiner*—Scott J. Sugarman
*Assistant Examiner*—DaWayne A Pinkney
(74) *Attorney, Agent, or Firm*—David A. Belasco; Belasco Jacobs & Townsley, LLP

(57) ABSTRACT

An image decoder system includes a series of optically or digitally encoded images mounted on a series of flat surfaces. A decoding lens is positioned over the encoded images. The decoding produces simulated three-dimensional image, simulated motion images or other visible effects. The system includes a backing plate to which the images and one or more decoding lenses are hingedly attached, resulting in a variety of decoding methods. To improve image clarity, locking devices such as Velcro fasteners, snaps, locking tabs, etc. are used to hold the lens to the image surface. Special inks for the encoded images and selected material for lens manufacture are used to improve contact between the image and the lens. Alignment marks are encoded with the image and used to match to alignment marks on the lens to clarify the decoded image. Wide, narrow and special combination lenticular lenses are used for special decoding effects.

22 Claims, 11 Drawing Sheets

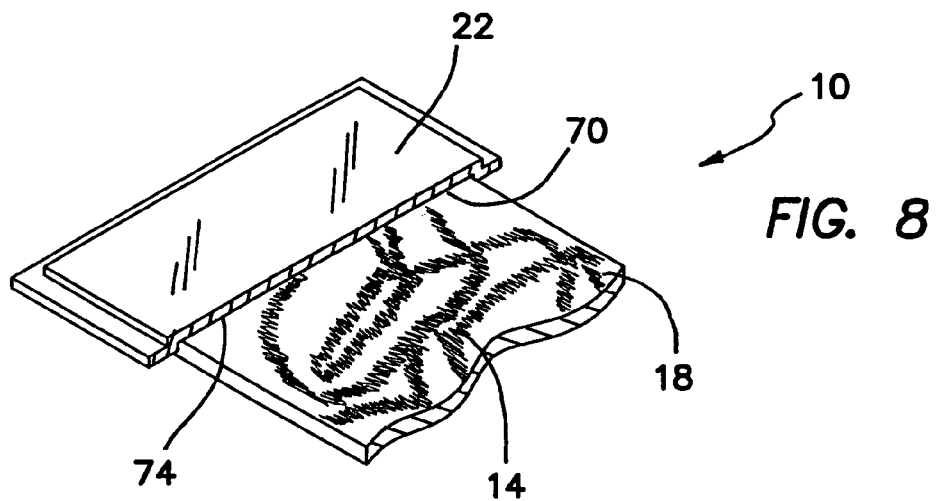
FIG. 8
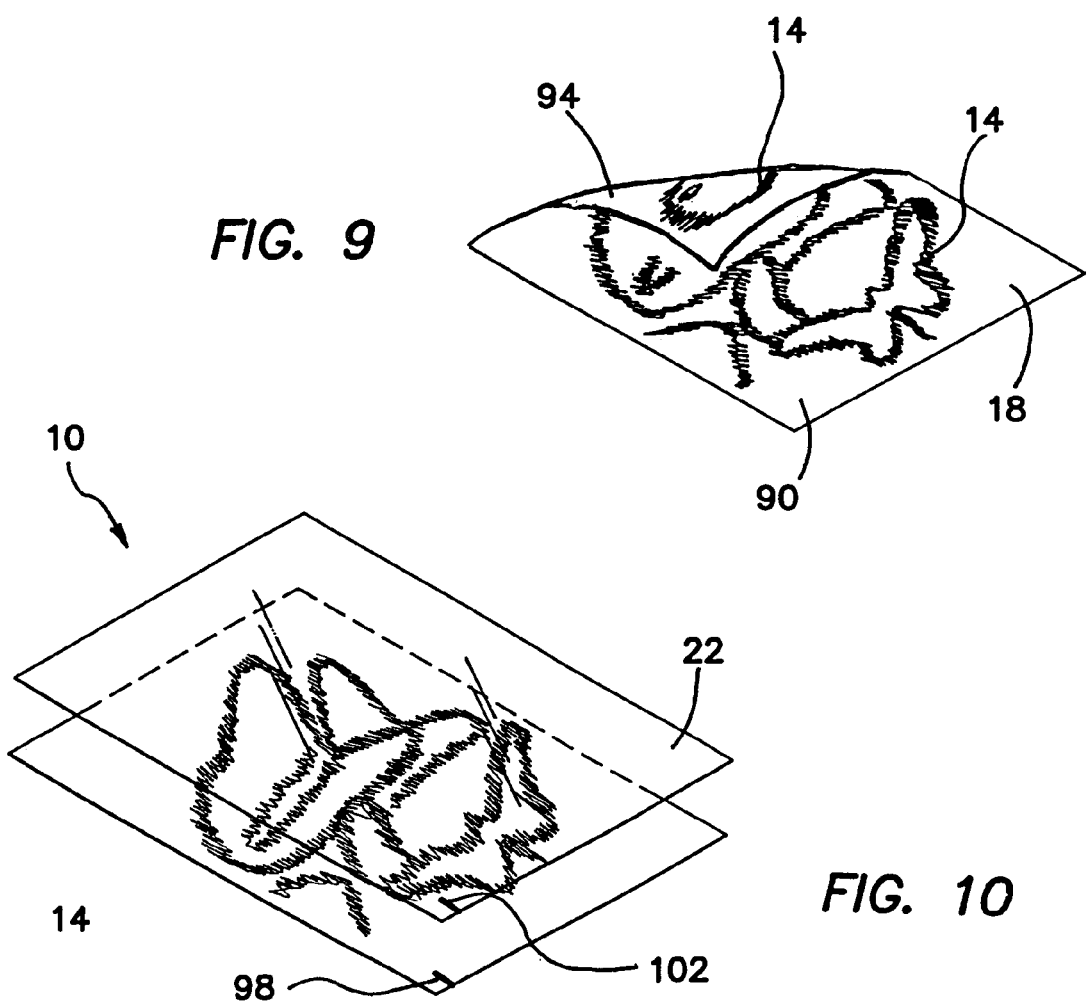
FIG. 9
FIG. 10

IMAGE DECODER SYSTEM

FIELD OF INVENTION

The present invention relates to image decoder systems. More particularly, systems that can decode digitally or optically encoded images on a printed page. The decoding system can be used to render a 3-D image, images simulating motion or other special effects.

BACKGROUND OF THE INVENTION

The decoding of encoded visual images has been used, in various forms, for some time for novelty items, teaching aids and other related purposes. Various systems have been developed to provide these decoding capabilities as shown by the following examples.

U.S. Pat. No. 4,714,275, issued to Engel et al., discloses a toy sticker collection album that comes with a removable viewer secured in the album, the viewer having a tinted transparent filter. The album contains photographic half-tone images printed in a first color with a second color pattern design printed over the half-tone images providing a camouflaging or obscuring effect. The filter can be placed over the photographic half-tone images so that they can be viewed. The user can select images to be purchased for collecting in the album.

U.S. Pat. No. 6,865,001, issued to Long et al. is directed to many embodiments of a system and method for encoding and decoding an image or document using holographic or diffractive means. The encoded image can be revealed using a transparent screen that has an array of opaque shapes that normally may be geometric. The shapes can vary in size or spacing and may vary from being readily viewable to too small to be seen with the unaided eye. The shapes can use a plurality of apparent gray levels and may have variable gray levels across each shape. A given document can have areas that require different screens for revealing the encoded areas.

U.S. Pat. No. 6,273,473, issued to Taylor et al. discloses self-verifying security documents. These self-verifying security documents have a transparent window 5 located so that the flexible document can be folded and the window located over a security device 4 located on the document. The window has a self-verifying means 11 that can be an optical lens that is Fresnel, a micro-lens array, or a lenticle lens. Any of the lenses can have a distorted view so as to correct for a distorted security device. The window can have a UV coating or an optical filter that is tinted or polarized. The polarized filter can be used for viewing polarized security devices and the tinted filters could be used for verifying metameric ink patterns. The filter can have a set of lines that form an interference effect with lines on the security device providing a Moiré pattern. The transmission of light through superimposed inclined lines can also produce the appearance of dark bands known as Talbot fringes.

U.S. Pat. No. 6,692,031, issued to McGrew, is directed to the use of quantum dots for fluorescent taggants. Quantum dot taggants can be used to make a UV curable ink by suspending the dots in a transparent UV curable resin. The ink can be used to make patterns of spectrally varying fluorescence. The ink can be read with a reader having a light of a suitable wavelength. The pattern can be viewed or a diffraction grating can be used to analyze the spectral and temporal properties of the ink.

U.S. Pat. No. 6,296,900, issued to Barnhart et al, discloses a method of making a hidden image game piece that can be revealed by flooding the image with light of the same color as the pattern's ink. An image using colored ink is deposited on a transparent or highly translucent substrate. A second pattern of colored ink of a different color is deposited on the substrate at a lower density and over at least a portion of the first pattern. When the piece is flooded with additive light of the same color as the second pattern's ink, the previously concealed image composed of the first pattern's ink becomes perceivable. A computer monitor or other low intensity source of additive light may be used to flood the piece.

U.S. Pat. No. 3,784,289, issued to Wicker, is directed to a method and apparatus for hiding and viewing half-tone images. Three half-tone images with similar frequencies are printed on a substrate. The first image is an overall half-tone at a given angle. The second image is a negative half-tone of the image to be hidden with the image at an angle to the first half-tone. The third image is the image to be hidden at a third angle and coincident with the negative portion of the second half-tone. The three half-tone components give a uniform appearance to the eye obscuring the image. The three half-tone components can be put on one plate if a single color is to be used. The image may be readily detected by using a screen having the same periodic pattern of similar frequency as the half-tones. When the screen is arranged at an angle of the half-tone screen of the hidden image, the hidden image can be made to appear as a bright image against a darker background. When the screen is arranged at the same angle as the background half-tone screen, the hidden image can be made to appear as a darker image against a brighter background. In either orientation, when the screen is moved parallel to the periodic pattern, the image will appear to blink.

U.S. Pat. No. 5,223,958, issued to Berry, discloses a heat activated amusement device employing micro-encapsulated thermochromic liquid crystals. A transparent film can have a visual image printed by conventional techniques for viewing through its first surface. A layer of micro-encapsulated thermochromic liquid crystal material is placed against the second surface of the film. A supporting substrate is added having substantially the same color as the printed message or visual image of the transparent film. The substrate 13 may be formed from any suitable material from which one desired the hidden message or visual image to appear upon heating. The amusement device can be heated by conductive heat transferred from a person's body. The thermochromic material starts off transparent and the image cannot be distinguished from the substrate. As it is heated, it goes through the visual spectrum whereby the image can be viewed because of the contrast until finally the thermochromic material reaches the temperature at which it becomes transparent again and the image cannot be distinguished from the substrate.

It is an objective of the present invention to provide a means for decoding optically or digitally encoded visual images on a printed page. It is a further objective to provide a system that allows for use of a single decoding lens with multiple images. It is a still further objective of the invention to provide a system that can decode 3-D images, those simulating motion and other optical special effects. Finally, it is an objective to provide a system that can be easily and inexpensively manufactured that produces full color images.

While some of the objectives of the present invention are disclosed in the prior art, none of the inventions found include all of the requirements identified.

SUMMARY OF THE INVENTION

The present invention addresses all of the deficiencies of prior art image decoder systems inventions and satisfies all of the objectives described above.

(1) An image decoder system providing the desired features can be constructed from the following components. A plurality of encoded images located on at least one flat surface is provided. At least one lens is provided. The lens is sized and shaped to fit over the encoded images. Means are provided for removably aligning the lens with the encoded images.

(2) In a variant of the invention, the encoded images are optically encoded.

(3) In another variant, the encoded images are digitally encoded.

(4) In still another variant, a plurality of flat surfaces is provided. Each of the flat surfaces has a first rectilinear edge and has encoded images located on it. The flat surfaces are hingedly attached to one another at the first rectilinear edge. The lens is hingedly mounted to removably align with each of the encoded images. When the lens is aligned over the encoded images, the images are decoded.

(5) In yet another variant, a backing plate is provided. The backing plate has orthogonally located second and third rectilinear edges and is hingedly attached at the second edge to the flat surfaces at the first rectilinear edge. The lens has a fourth rectilinear edge and is hingedly attached at the fourth edge to the third rectilinear edge. When the lens is rotated away from the backing plate, the flat surfaces may be rotated to position each of the flat surfaces in turn on a top of a stack of the surfaces or against the backing plate. The lens may then be rotated on top of a selected encoded image on one of the flat surfaces.

(6) In a further variant, the backing plate further includes a fifth rectilinear edge. The fifth edge hingedly attaches a second lens to the backing plate. When the second lens is positioned over the encoded images or the lens, the encoded images may be decoded in a different manner.

(7) In still a further variant, the backing plate further includes a sixth rectilinear edge. The sixth edge hingedly attaches a third lens to the backing plate. When the third lens is positioned over the encoded images, the lens or the second lens the encoded images may be decoded in a different manner.

(8) In yet a further variant, the lens is concave, flat or convex and the backing plate is a mating concave, flat and convex shape, thereby promoting improved contact between the lens and the encoded images.

(9) In another variant of the invention, the lens comprises a recess on a surface in contact with the encoded images, thereby promoting improved contact between the lens and the encoded images.

(10) In still another variant, material used in forming the lens and material used in creating the encoded image are formulated to adhere together, thereby increasing contact between the lens and the encoded image thus increasing sharpness of a decoded image.

(11) In yet another variant, the flat surfaces have encoded images on a front surface or a back surface.

(12) In a further variant, first alignment marks are provided. The first marks are located on or adjacent to the encoded images. Second alignment marks are provided. The second marks are located on the lens. When the first alignment marks are located over the second alignment marks, the encoded image will be properly aligned with the lens.

(13) In still a further variant, the first alignment marks are encoded with the encoded image.

(14) In yet a further variant, the system further includes locking features to insure alignment of the lens with the encoded image.

(15) In yet a further variant, the locking features includes first and second tabs. The tabs are positioned at upper and lower ends of the encoded image and lock into a hinged attachment of the encoded images to the backing plate.

(16) In another variant of the invention, the locking features include attachment means located at an edge of the encoded image opposite the hinged attachment to the backing plate.

(17) In still another variant, the locking features are selected from the group consisting of hooking and looping fasteners, snaps, magnetic devices and edge in groove locks.

(18) In yet another variant, the backing plate further includes a resilient surface. The resilient surface provides increased contact between the lens and the encoded image, thereby increasing sharpness of a decoded image.

(19) In a further variant, the lens is selected from the group consisting of lenticular, barrier, fish eye, insect eye (multiple bubble) and custom lenses with unique patterns. A lenticular lens, or lens sheet is created by an assembly of identical parallel angled ridges in the lens material.

(20) In still a further variant, the lens is a narrowly angled lenticular lens optimizing rendering a simulated three-dimensional image.

(21) In yet a further variant, the lens is a widely angled lenticular lens optimizing rendering an image simulating movement.

(22) In another variant of the invention, the lens is a medium angled lenticular lens optimizing rendering a simulated three-dimensional image or an image simulating movement when both are combined in a single encoded image.

(23) In still another variant, the insect eye lens includes a lenticular lens that has both vertical and horizontal lens lines, thereby permitting decoding of one image in a vertical plane and one image in a horizontal plane.

(24) In a final variant of the invention, the custom lens includes a lenticular lens that has both widely spaced lenticules and narrowly spaced lenticules.

DESCRIPTION OF THE DRAWINGS

FIG. 8 is a perspective view of a lens with a recess at its lower surface to promote better contact with the encoded image;

FIG. 9 is a perspective view of a flat surface having encoded images on front and back surfaces;

FIG. 10 is a perspective view of a flat surface having first alignment marks adjacent the encoded images and a lens with matching second alignment marks;

DETAILED DESCRIPTION OF THE PREFERRED EMBODIMENT (1) FIGS. 1-20 illustrate an image decoder system 10 providing the desired features that can be constructed from the following components. As illustrated in FIGS. 1A, 1B and 2, a plurality of encoded images 14 located on at least one flat surface 18 is provided. At least one lens 22 is provided. The lens 22 is sized and shaped to fit over the encoded images 14. Means 26 are provided for removably aligning the lens 22 with the encoded images 14.

(2) In a variant of the invention, the encoded images 14 are optically encoded.

(3) In another variant, the encoded images 14 are digitally encoded.

Figure 3A:
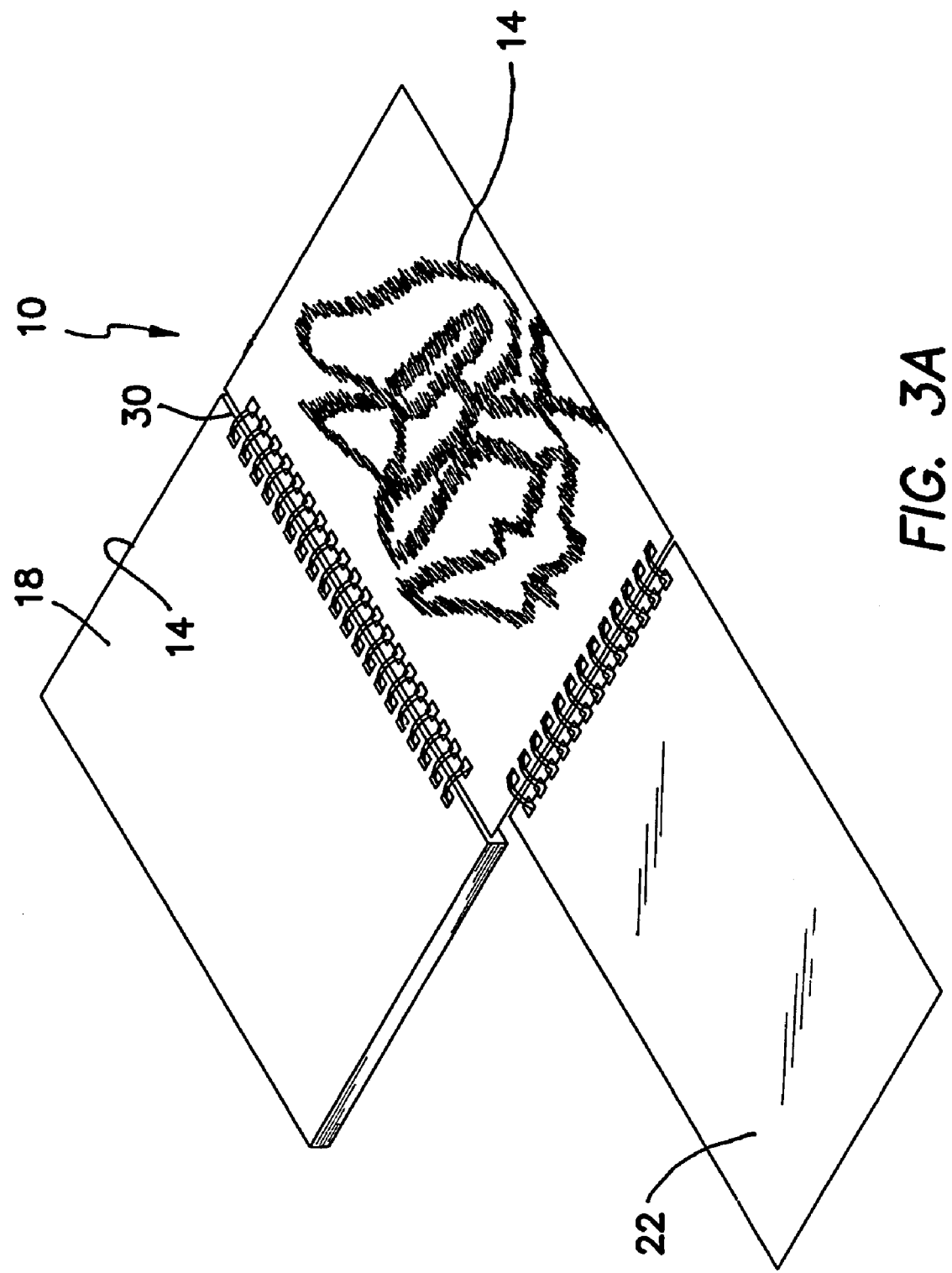
FIG. 3A is a perspective view of a third embodiment in which the flat surfaces and lens are orthogonally, hingedly attached.

(4) In still another variant, FIG. 3A is a perspective view of a third embodiment illustrating a backing pad to which the flat surfaces and lens are orthogonally, hingedly attached; 3A, a plurality of flat surfaces 18 is provided. Each of the flat surfaces 18 has a first rectilinear edge 30 and has encoded images 14 located on it. The flat surfaces 18 are hingedly attached to one another at the first rectilinear edge 30. The lens 22 is hingedly mounted to removably align with each of the encoded images 14. When the lens 22 is aligned over the encoded images 14, the images 14 are decoded.

Figure 3B:
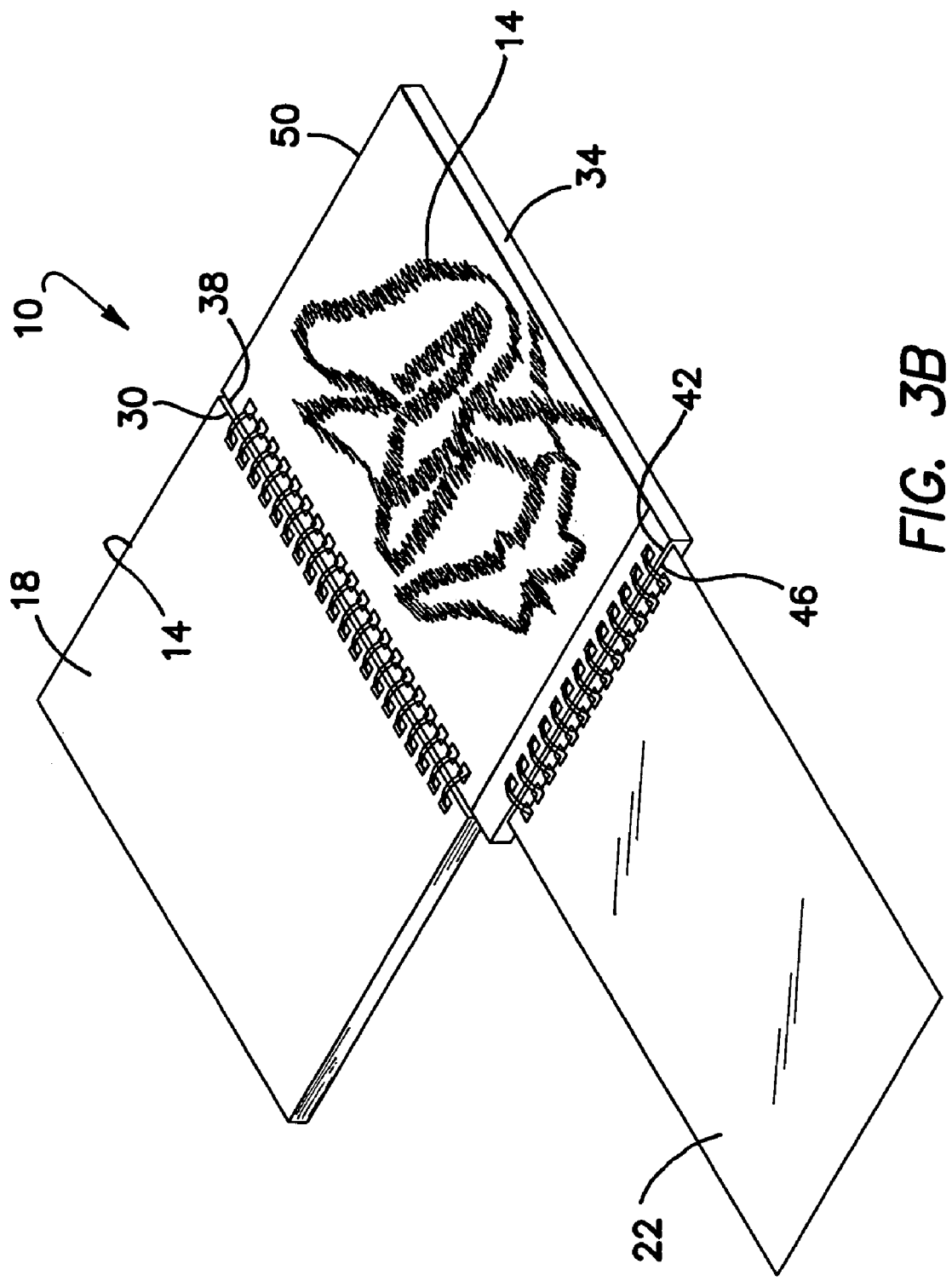
FIG. 3B is a perspective view of a third embodiment illustrating a backing pad to which the flat surfaces and lens are orthogonally, hingedly attached.

(5) In yet another variant, as illustrated in FIG. 3B, a backing plate 34 is provided. The backing plate 34 has orthogonally located second 38 and third 42 rectilinear edges and is hingedly attached at the second edge 38 to the flat surfaces 18 at the first rectilinear edge 30. The lens 22 has a fourth rectilinear edge 46 and is hingedly attached at the fourth edge 46 to the third rectilinear edge 42. When the lens 22 is rotated away from the backing plate 34, the flat surfaces 18 may be rotated to position each of the flat surfaces 18 in turn on a top of a stack 50 of the surfaces 18 or against the backing plate 34. The lens 22 may then be rotated on top of a selected encoded image 14 on one of the flat surfaces 18.

Figure 4:
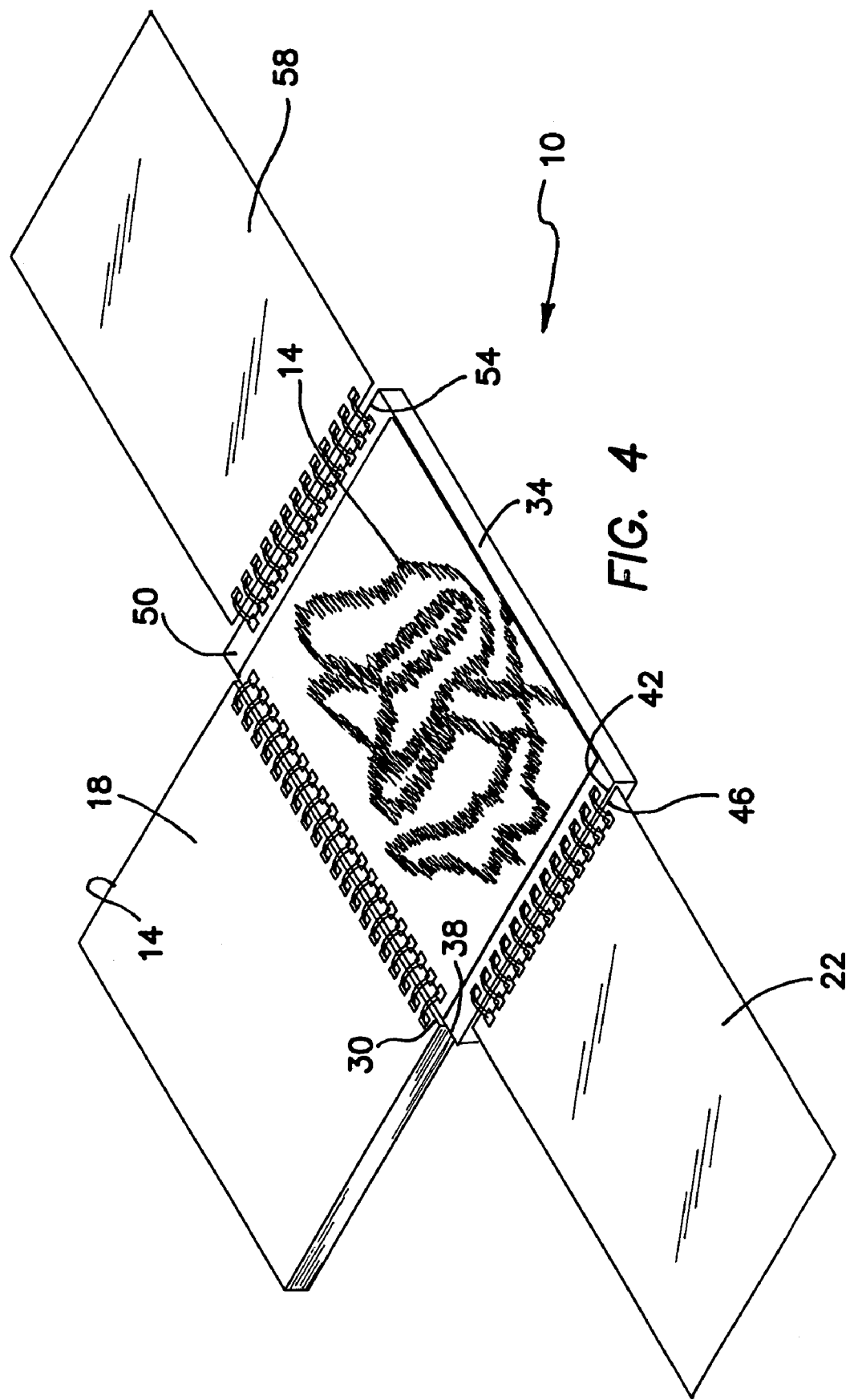
FIG. 4 a perspective view of a fourth embodiment illustrating a second lens hingedly attached to a rectilinear edge opposite the attachment of the FIG. 3 lens.

(6) In a further variant, as illustrated in FIG. 4, the backing plate 34 further includes a fifth rectilinear edge 54. The fifth edge 54 hingedly attaches a second lens 58 to the backing plate 34. When the second lens 58 is positioned over the encoded images 14 or the lens 22, the encoded images 14 may be decoded in a different manner.

Figure 5:
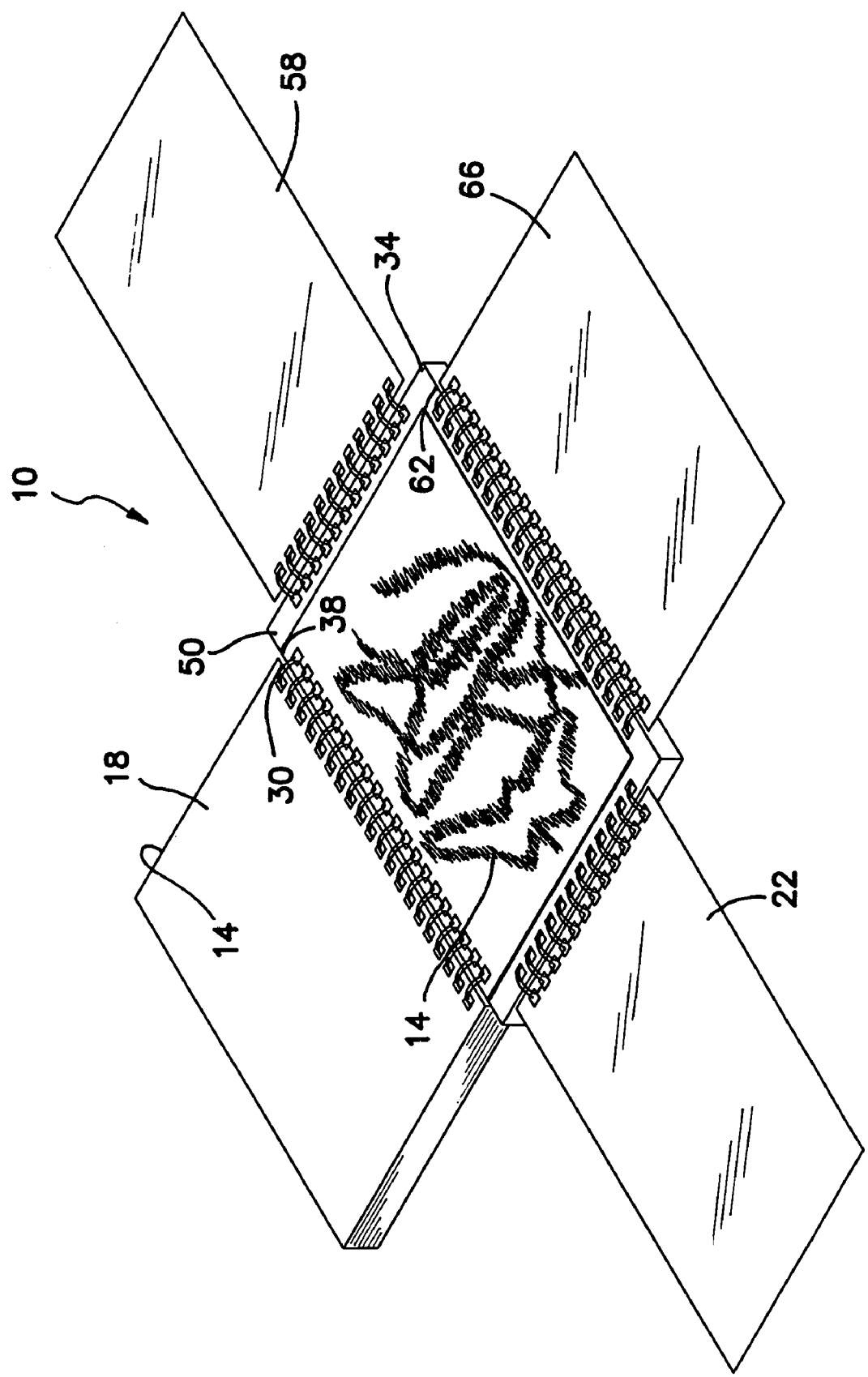
FIG. 5 a perspective view of a fifth embodiment illustrating a third lens hingedly attached to a rectilinear edge opposite the attachment of the flat surfaces.

(7) In still a further variant, as illustrated in FIG. 5, the backing plate 34 further includes a sixth rectilinear edge 62. The sixth edge 62 hingedly attaches a third lens 66 to the backing plate 34. When the third lens 66 is positioned over the encoded images 14, the lens 22 or the second lens 58 the encoded images 14 may be decoded in a different manner.

Figure 6:
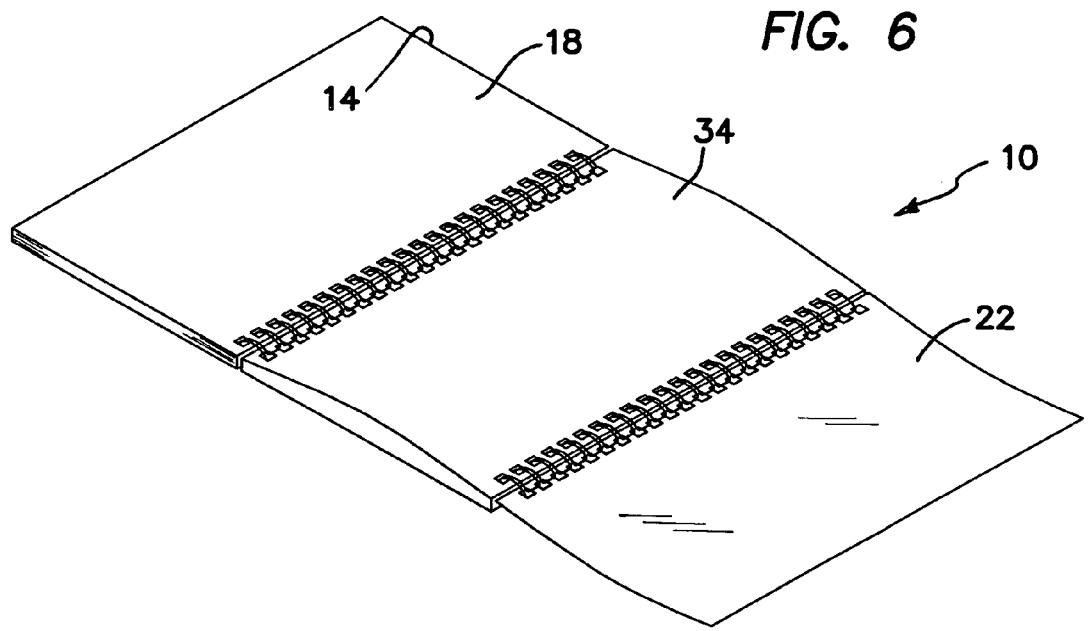
FIG. 6 is a perspective view of a concave lens and mating concave surface supporting the encoded image.
Figure 7:
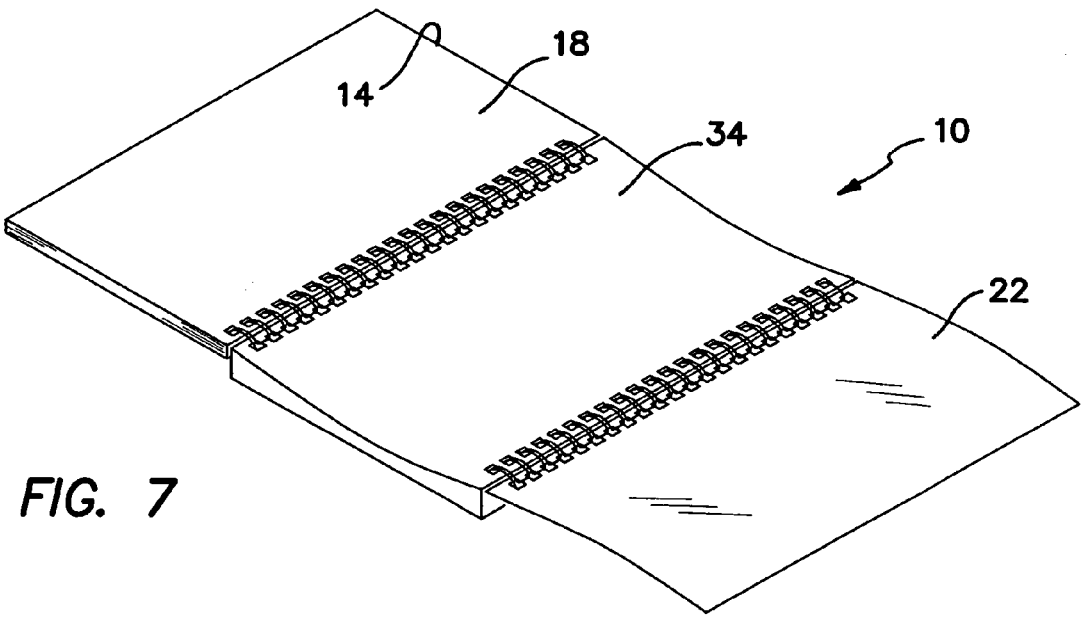
FIG. 7 is a perspective view of a convex lens and mating convex surface supporting the encoded image.

(8) In yet a further variant, as illustrated in FIGS. 6 and 7, the lens 22 is concave, flat or convex and the backing plate 34 is a mating concave, flat and convex shape, thereby promoting improved contact between the lens 22 and the encoded images 14.

(9) In another variant of the invention, as illustrated in FIG. 8, the lens 22 comprises a recess 70 on a surface 74 in contact with the encoded images 14, thereby promoting improved contact between the lens 22 and the encoded images 14.

Figure 1A:
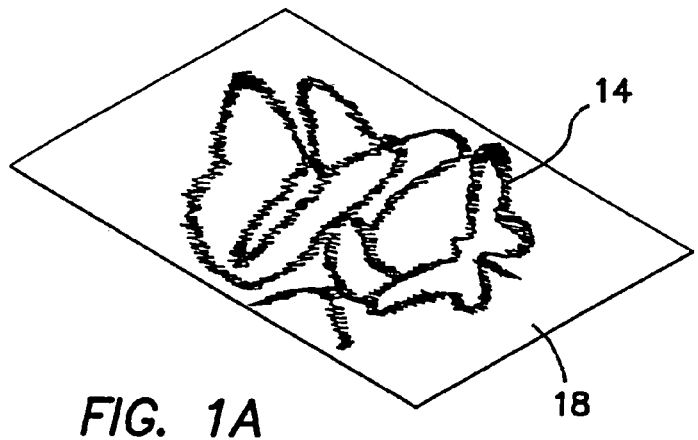
FIGS. 1A and 1B are perspective view of a first embodiment of the present invention illustrating an encoded image disposed on flat surface and a removable lens positionable over the images.
Figure 1B:
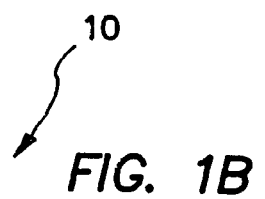
Figure 2:
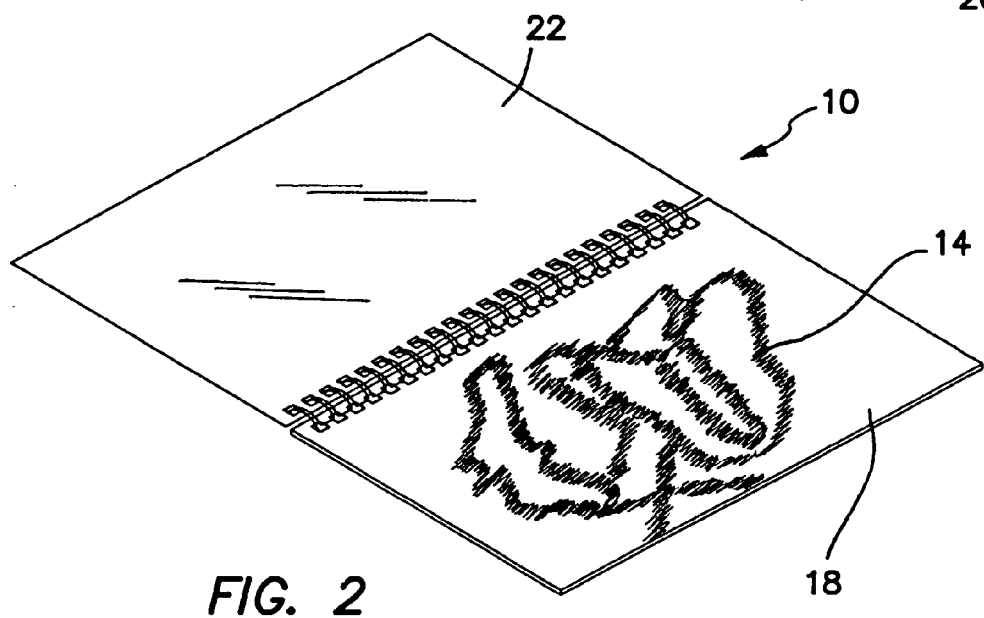
FIG. 2 is a perspective view of a second embodiment illustrating the flat surface hingedly attached at the rectilinear edge and the lens hingedly attached to the rectilinear edge.

(10) In still another variant, material (not shown) used in forming the lens 22 and material (not shown) used in creating the encoded image 14 are formulated to adhere together, thereby increasing contact between the lens 22 and the encoded image 14 thus increasing sharpness of a decoded image 86, as shown in FIG. 1B.

(11) In yet another variant, as illustrated in FIG. 9, the flat surfaces 18 have encoded images 14 on a front surface 90 or a back surface 94.

(12) In a further variant, as illustrated in FIG. 10, first alignment marks 98 are provided. The first marks 98 are located on or adjacent to the encoded images 14. Second alignment marks 102 are provided. The second marks 102 are located on the lens 22. When the first alignment marks 98 are located over the second alignment marks 102, the encoded image 14 will be properly aligned with the lens 22.

Figure 11:
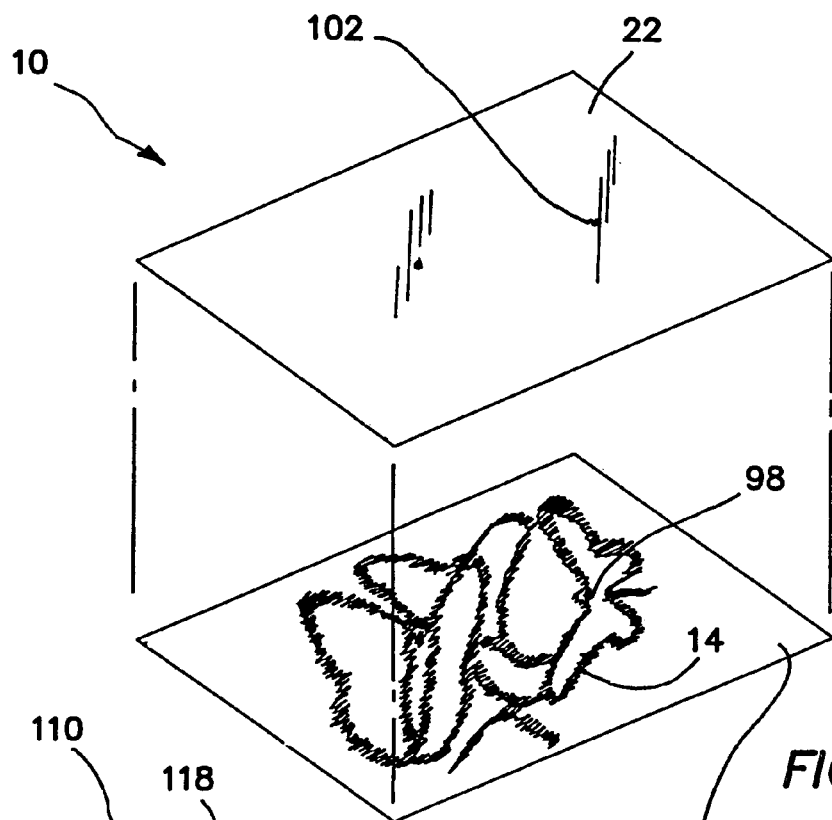
FIG. 11 is a perspective view of a flat surface having first alignment marks encoded with the encoded images.

(13) In still a further variant, as illustrated in FIG. 11, the first alignment marks 98 are encoded with the encoded image 14.

Figure 12:
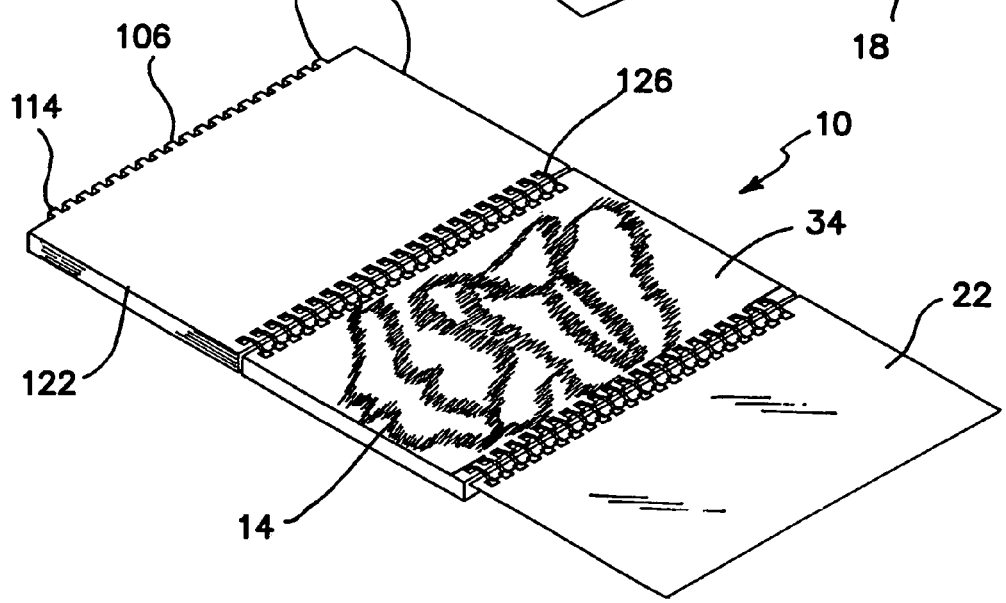
FIG. 12 is a perspective view of first and second locking tabs at upper and lower ends of the encoded images locking into the hinged attachment of the images to the backing plate.
Figure 13:
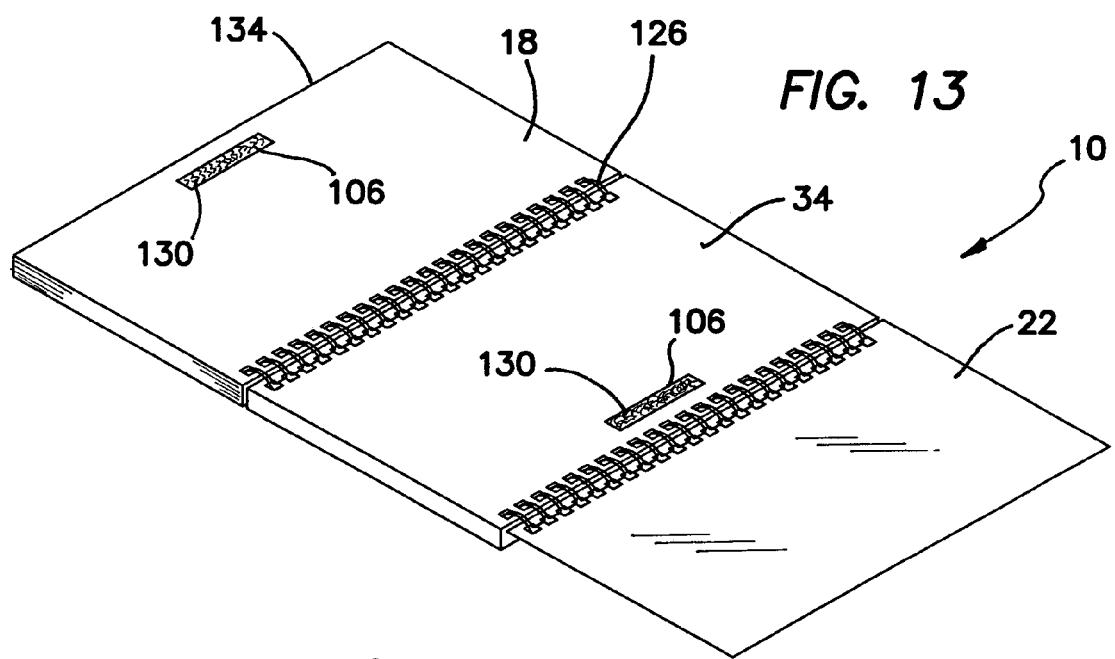
FIG. 13 is a perspective view of locking features located at an edge of the encoded image opposite the hinged attachment to the backing plate.
Figure 14:
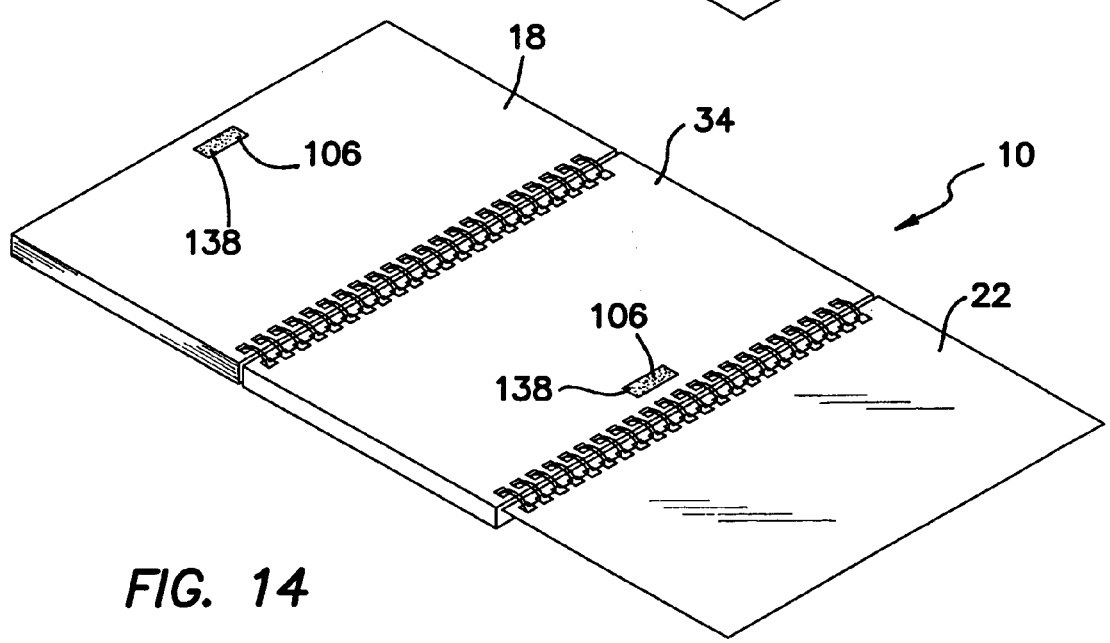
FIG. 14 is a perspective view of locking features including hooking and looping fasteners, snaps, magnetic devices and edge in groove locks.

(14) In yet a further variant, as illustrated in FIGS. 12-14, the system further includes locking features 106 to insure alignment of the lens 22 with the encoded image 14.

(15) In yet a further variant, as illustrated in FIG. 12, the locking features 106 includes first 110 and second 114 tabs. The tabs 110, 114 are positioned at upper 118 and lower 122 ends of the encoded image 14 and lock into a hinged attachment 126 of the encoded images 14 to the backing plate 34.

(16) In another variant of the invention, as illustrated in FIG. 13, the locking features 106 include attachment means 130 located at an edge 134 of the encoded image 14 opposite the hinged attachment 126 to the backing plate 34.

(17) In still another variant, as illustrated in FIGS. 13 and 14, the locking features 106 are selected from the group consisting of hooking and looping fasteners 138, snaps (not shown), magnetic devices (not shown) and edge in groove locks (not shown).

Figure 15:
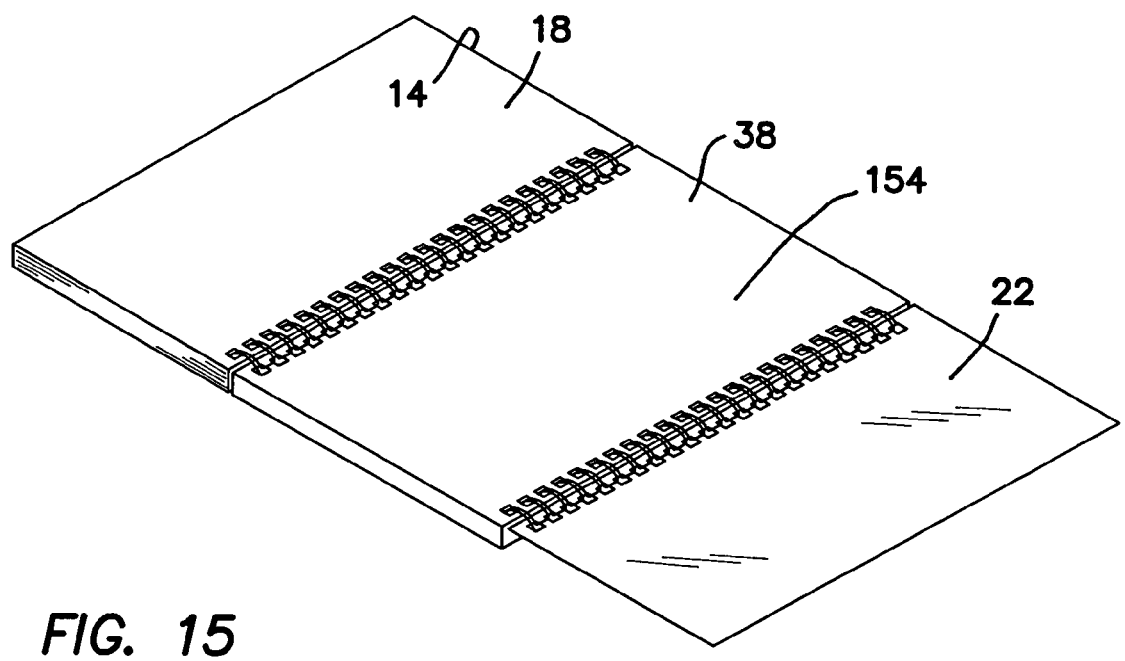
FIG. 15 is a perspective view of the backing plate including a resilient surface.
Figure 16A:
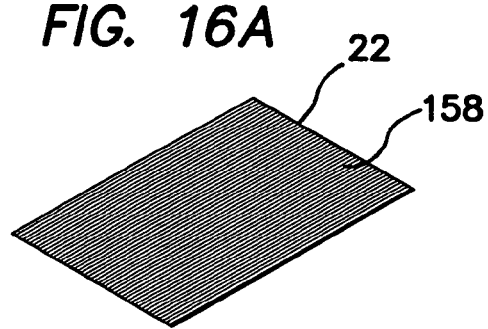
FIG. 16 is a perspective view of a lenticular lens, a barrier lens, fish eye lens and a multiple bubble lens.
Figure 16B:
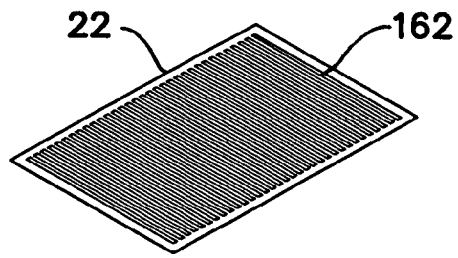
Figure 16C:
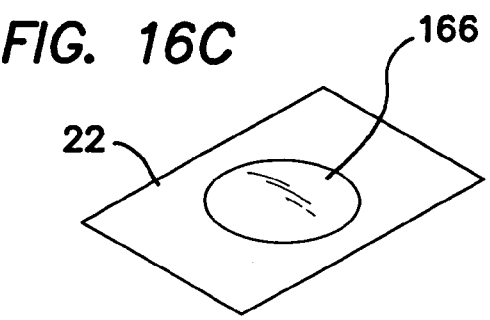
Figure 16D:
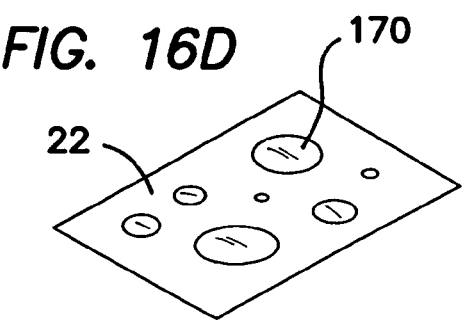

(18) In yet another variant, as illustrated in FIG. 15, the backing plate 34 further includes a resilient surface 154. The resilient surface 154 provides increased contact between the lens 22 and the encoded image 14, thereby increasing sharpness of a decoded image 86.

(19) In a further variant, as illustrated in FIGS. 16A-16D, the lens 22 is selected from the group consisting of lenticular 158, barrier 162, fish eye 166, insect eye (multiple bubble) 170 and custom lenses with unique patterns (not shown). A lenticular lens 158, or lens sheet is created by an assembly of identical parallel angled ridges 160 in the lens material 78.

Figure 17:
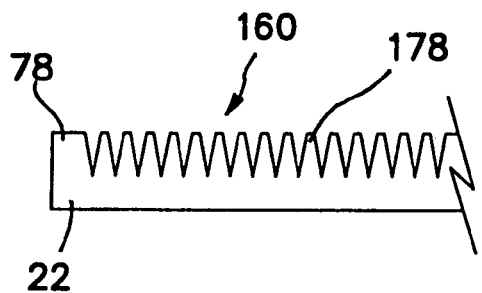
FIG. 17 is a perspective view of a narrow angled lenticular lens.

(20) In still a further variant, as illustrated in FIG. 17, the lens 22 is a narrowly angled lenticular lens 178 optimizing rendering a simulated three-dimensional image (not shown).

Figure 18:
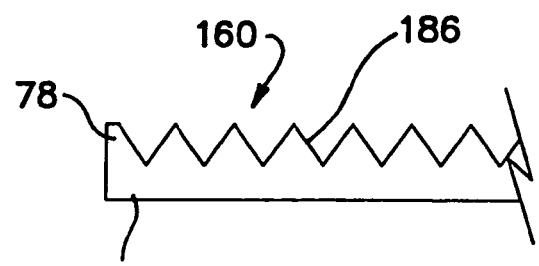
FIG. 18 is a perspective view of a wide angled lenticular lens.

(21) In yet a further variant, as illustrated in FIG. 18, the lens 22 is a widely angled lenticular lens 186 optimizing rendering an image simulating movement (not shown).

Figure 19:
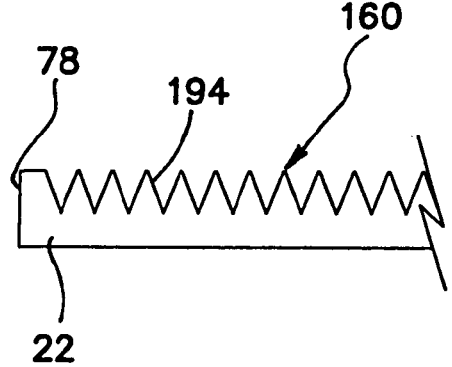
FIG. 19 is a perspective view of a medium angled lenticular lens.

(22) In another variant of the invention, as illustrated in FIG. 19, the lens 22 is a medium angled lenticular lens 194 optimizing rendering a simulated three-dimensional image or an image simulating movement when both are combined in a single encoded image 14.

Figure 20:
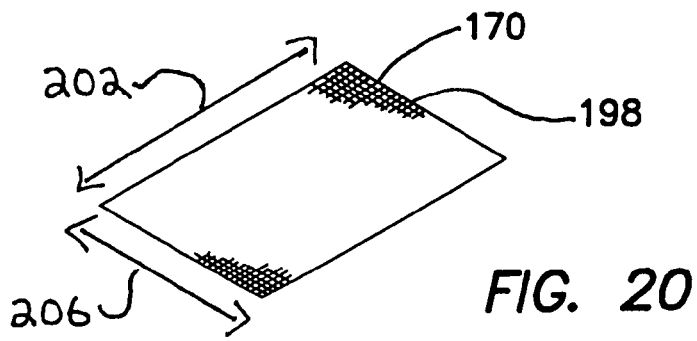
FIG. 20 is a perspective view of a lenticular lens having both vertical and horizontal lens lines.

(23) In still another variant, as illustrated in FIG. 20, the insect eye lens 170 includes a lenticular lens that has both vertical and horizontal lens lines 198, thereby permitting decoding of one image 14 in a vertical plane 202 and one image 14 in a horizontal plane 206.

Figure 21:
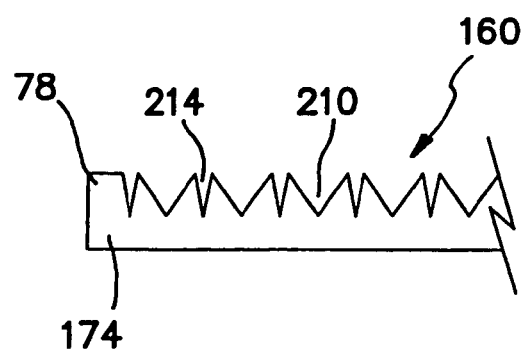
FIG. 21 is a perspective view of a lenticular lens having both widely spaced lenticules and narrowly spaced lenticules.

(24) In a final variant of the invention, as illustrated in FIG. 21, the custom lens 174 includes a lenticular lens that has both widely spaced lenticules 210 and narrowly spaced lenticules 214.

The image decoder system 10 has been described with reference to particular embodiments. Other modifications and enhancements can be made without departing from the spirit and scope of the claims that follow.

The invention claimed is:

1. An image decoding system, comprising:
   a plurality of flat surfaces, each of said flat surfaces having a first rectilinear edge and having at least one encoded image disposed thereon;
   said flat surfaces being hingedly attached to one another at said first rectilinear edge;
   a backing plate, said backing plate having second and third rectilinear edges and being hingedly attached at said second edge to said flat surfaces at said first rectilinear edge;
   at least one lens, said lens being sized and shaped to fit over said encoded images;
   said lens having a fourth rectilinear edge and being hingedly attached at said fourth edge to said third rectilinear edge; and
   each of said encoded images being alternately decoded with said lens as said lens is positioned over each of said flat surfaces.

2. The image decoding system, as described in claim 1, wherein said encoded images are optically encoded.

3. The image decoding system, as described in claim 1, wherein said encoded images are digitally encoded.

4. The image decoding system, as described in claim 1, wherein said backing plate further comprises:
   a fifth rectilinear edge, said fifth edge hingedly attaching a second lens to said backing plate; and
   said second lens is positioned over either of said encoded images and said lens and said encoded images are decoded in a different manner.

5. The image decoding system, as described in claim 4, wherein said backing plate further comprises:
   a sixth recuilinear edge, said sixth edge hingedly attaching a third lens to said backing plate; and
   said third lens is positioned over either of said encoded images, said lens and said second lens and said encoded images are decoded in a different manner.

6. The image decoding system, as described in claim 1, wherein said lens is either of concave, flat and convex and said backing plate is either of a mating concave, flat and convex shape, thereby promoting improved contact between said lens and said encoded images.

7. The image decoding system, as described in claim 1, wherein said lens comprises a recess on a surface in contact with said encoded images, thereby promoting improved contact between said lens and said encoded images.

8. The image decoding system, as described in claim 1, wherein material used in forming said lens and material used in creating said encoded image are formulated to adhere together, thereby increasing contact between said lens and said encoded image thus increasing sharpness of a decoded image.

9. The image decoding system, as described in claim 1, wherein said flat surfaces have encoded images on either of a front surface and a back surface.

10. The image decoding system, as described in claim 1, wherein said system further comprises:
    first alignment marks, said first marks being disposed upon either of said encoded images and adjacent to said encoded images;
    second alignment marks, said second marks being disposed upon said lens; and
    whereby when said first alignment marks are disposed over said second alignment marks, said encoded image will be properly aligned with said lens.

11. The image decoding system, as described in claim 10, wherein said first alignment marks are encoded with said encoded image.

12. The image decoding system, as described in claim 1, wherein said system further comprises locking features to insure alignment of said lens with said encoded image.

13. The image decoding system, as described in claim 12, wherein said locking features comprise first and second tabs, said tabs positioned at upper and lower ends of said encoded image and locking into a hinged attachment of said encoded images to said backing plate.

14. The image decoding system, as described in claim 12, wherein said locking features comprise attachment means disposed at an edge of said encoded image opposite said hinged attachment to said backing plate.

15. The image decoding system, as described in claim 14, wherein said locking features are selected from the group consisting of:
    hooking and looping fasteners, snaps, magnetic devices and edge in groove locks.

16. The image decoding system, as described in claim 1, wherein said backing plate further comprises a resilient surface, said resilient surface providing increased contact between said lens and said encoded image, thereby increasing sharpness of a decoded image.

17. The image decoding system, as described in claim 1, wherein said lens is selected from the group consisting of:
    lenticular, barrier, fish eye, insect eye (multiple bubble) and custom lenses with unique patterns.

18. The image decoding system, as described in claim 1, wherein said lens is a narrowly angled lenticular lens optimizing rendering a simulated three-dimensional image.

19. The image decoding system, as described in claim 1, wherein said lens is a widely angled lenticular lens optimizing rendering an image simulating movement.

20. The image decoding system, as described in claim 1, wherein said lens is a medium angled lenticular lens optimizing rendering either of a simulated three-dimensional image and an image simulating movement, both combined in a single encoded image.

21. The image decoding system, as described in claim 17, wherein said insect eye lens comprises a lenticular lens having both vertical and horizontal lens lines, thereby permitting decoding of one image in a vertical plane and one image in a horizontal plane.

22. The image decoding system, as described in claim 17, wherein said custom lens comprises a lenticular lens having both widely spaced lenticules and narrowly spaced lenticules.

* * * * *